United States Patent [19]  [11]  4,305,848
Hikita et al.  [45]  Dec. 15, 1981

[54] METHOD OF PRODUCING HIGH CONDUCTIVE SINTERS

[75] Inventors: Shigeyuki Hikita, Nagoya; Tamotsu Horiba, Gifu, both of Japan

[73] Assignee: Kabushiki Kaisha Tokai Rika Denki Seisakusho, Aichi, Japan

[21] Appl. No.: 96,557

[22] Filed: Nov. 21, 1979

[30] Foreign Application Priority Data

Nov. 22, 1978 [JP] Japan .................. 53/145044

[51] Int. Cl.³ .............................. H01B 1/06
[52] U.S. Cl. .................. 252/519; 252/521; 264/61; 501/152
[58] Field of Search .......... 252/521, 518, 519; 106/63, 73.2; 75/213; 264/61, 65; 423/21, 263

[56] References Cited

U.S. PATENT DOCUMENTS

| 3,893,821 | 7/1975 | Davies et al. | 252/521 |
| 3,974,108 | 8/1976 | Staut et al. | 252/521 |
| 3,981,726 | 9/1976 | Douglas et al. | 252/521 |
| 4,013,592 | 3/1977 | Matsuoka et al. | 252/521 |
| 4,045,375 | 8/1977 | Komatu | 252/521 |
| 4,054,532 | 10/1977 | Hanke | 252/521 |
| 4,156,661 | 5/1979 | Brodmann et al. | 252/521 |

Primary Examiner—Benjamin R. Padgett
Assistant Examiner—J. L. Barr
Attorney, Agent, or Firm—Wenderoth, Lind & Ponack

[57] ABSTRACT

This application is directed to a method of manufacturing high conductive sinters of a conductive lanthanum, chromium composite oxide material in which the specific resistance is extremely reduced with a rise in temperature, and whereby an extremely superior sinter can be provided as a heat resisting conductive material. The method of manufacturing sinters in accordance with the present invention is free from the conventional disadvantages of manufacturing sinters with conductive composite oxides of La and Cr as major components, which serves to improve the sintering properties and qualities of the product. The sinters can be easily manufactured at a temperature as low as approximately 1,500° C., which is lower than temperatures previously used.

12 Claims, 1 Drawing Figure

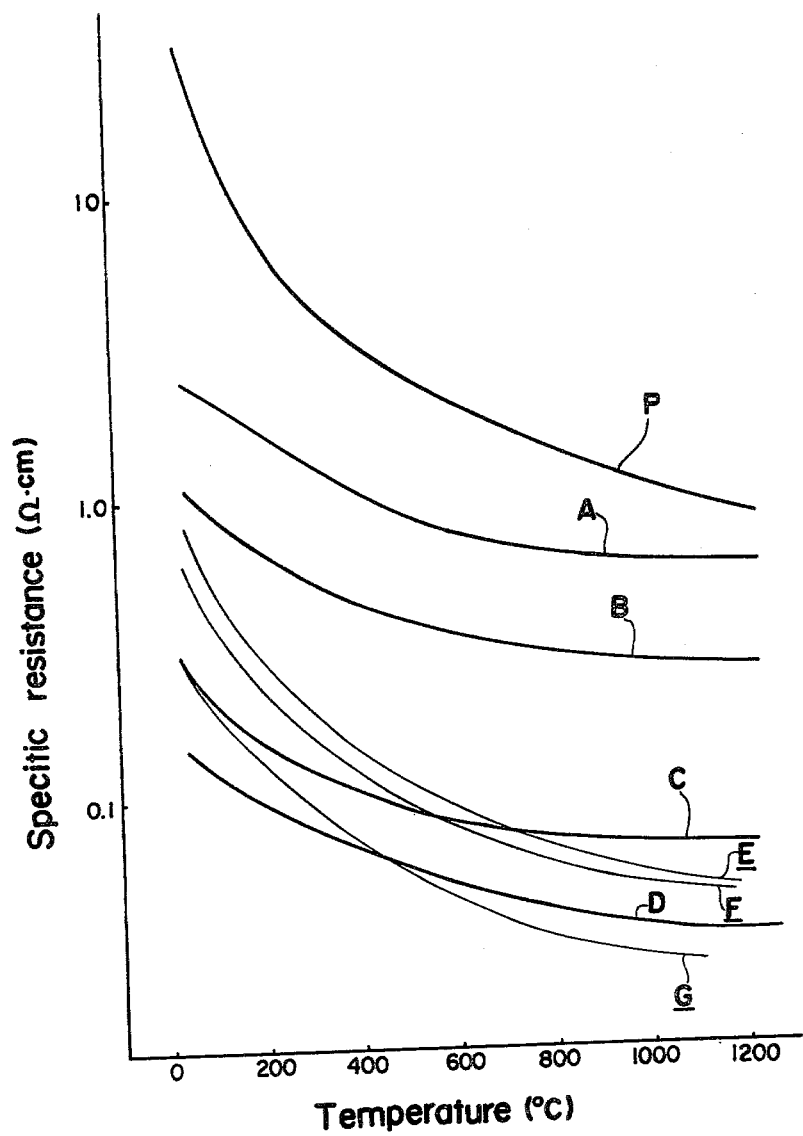

METHOD OF PRODUCING HIGH CONDUCTIVE SINTERS

BACKGROUND OF THE INVENTION

The present invention relates to a method of manufacturing high conductive sinters and more particularly to a method of manufacturing high conductive sintered products made of conductive lanthanum.chromium composite oxide materials.

Although a composite oxide sinter including lanthanum oxide ($La_2O_3$) and chromium oxide ($Cr_2O_3$) is normally a high resistor, a composition wherein one portion of the La ion within the lanthanum oxide is a solid-solution-substituted by a Sr ion or a Ca ion and sintered in an oxidation atmosphere is known as a conductive composite oxide which has a specific resistance ranging from several $\Omega cms$ to several tens $\Omega cms$. However, the sintering operation of the composite oxide of these conductive $La_2O_3.Cr_2O_3$ materials, which is usually performed at temperatures of 1,700° C. or more, or made by a hot press operation in the temperature range of 1,600° to 1,700° C., requires such extremely high temperatures that the sintering properties of the resultant material is often inferior and it is extremely difficult to manufacture sintered materials of good characteristics.

It is well known in fact that, in the case that the composite oxide of the conventional known La—Cr combination is a composition wherein one portion of the La ion is solid-solution-substituted by a Sr ion and is sintered in an oxidation atmosphere, namely, 1 to 60% of La ion of $(La.Sr)CrO_3$ is substituted by an Nd or Y ion; 1 to 20% of a Cr ion is substituted by a Co ion, 1 to 60% of an La ion is substituted by an Nd or Y ion or 1 to 20%, of a Cr ion is substituted by a Co ion, the sintering properties and conductive properties of such materials are not improved when the substitution amount is 1% or less, respectively. In addition thereto, when the solid-solution-substitution-amount of the La ion by an Nd or y ion exceeds 60%, the conductive properties are undesirably lowered, and when the solid-solution-substitution-amount of the Cr ion by the Co ion exceeds 20%, the heat-resisting properties are undesirably lowered. To eliminate the above disadvantages of the known method, according to the present invention, the solid-solution-substitution-amount of La by Nd or y is restricted to within the range of 1 to 60% and the solid-solution substitution-amount of Cr by Co is restricted to within the range of 1 to 20%.

SUMMARY OF THE INVENTION

Accordingly, an essential object of the present invention is to provide a sintering method which is free from the conventional disadvantages in the method of manufacturing sinters with conductive composite oxides of La and Cr as major components, thereby to improve the sintering properties and qualities in respect to the electric conductivity and heat resistivity.

According to a first embodiment of the present invention, a method of manufacturing high conductive sinters having lanthanum and chromium oxides comprises the step of solid-solution-substituting 1 to 60% of a lanthanum ion in a weight ratio by a neodymium or yttrium ion in an oxidation atmosphere. The substitution quantity of lanthanum ion is more preferably 1 to 40% by weight and most preferably to be 1 to 40%. It is to be noted that the expression "substitution amount of lanthanum ion is 60%" means that "substitution is performed in an amount by weight of 60%" when the quantity of La in the $LaCrO_3$ is originally 100% by weight. Accordingly, in the composition $(La_{0.3}Nd_{0.3}Sr_{0.4})CrO_3$, for instance, 70% of the La 100% has been substituted by Nd and Sr. The quantity of La substituted by Nd is calculated from the molar ratio between Nd and Sr, and the atomic weight.

According to a second embodiment of the present invention, a method of manufacturing high conductive sinters containing lanthanum and chromium oxides comprises the step of solid-solution-substituting 1 to 20% of the weight of a chromium ion in an oxidation atmosphere by a cobalt ion.

According to a third embodiment of the present invention, a method of manufacturing high conductive sinters having lanthanum and chromium oxides comprises the step of solid-solution-substituting 1 to 60% by weight of a lanthanum ion in an oxidation atmosphere by a neodymium ion and 1 to 20% of chromium by a cobalt ion.

These and other objects, features, aspects and advantages of the present invention will become more apparent from the following detailed description of the embodiments when taken in conjunction with an accompanying drawing.

BRIEF DESCRIPTION OF THE DRAWINGS

The accompanied drawing is a correlation chart showing the influences of specific resistances upon temperatures, in the embodiments of the high conductive sinters of the present invention, by comparison with conventional sintered products.

DETAILED DESCRIPTION OF THE INVENTION

The embodiments of the present invention will be described by comparison with a conventional example, with reference to the accompanying drawing.

EMBODIMENT 1

$La_2O_3$ in an amount of 48.9 g, $Nd_2O_3$ in an amount of 50.5 g, $SrCO_3$ in an amount of 59.1 g and $Cr_2O_3$ in an amount of 76.0 g were mixed and heated at 1,350° C. for one hour to synthesize $(La_{0.3}Nd_{0.3}Sr_{0.4})CrO_3$. The $(La_{0.3}Nd_{0.3}Sr_{0.4})CrO_3$ were pulverized, filled in a forming mold and pressed under the pressure of 1 t per $cm^2$ and, thereafter, it was sintered in air at 1,500° C. for four hours. The coefficient of linear contraction of the sinter obtained was 2.5%. In addition, platinum paint was baked on the end faces of the sinter, which was formed with 12 mm in diameter and 15 mm in length to continuously measure specific resistance before 1,200° C. was reached. The characteristic of results are shown by a curve A of the accompanying chart.

For comparison with the results, the $(La.Sr)CrO_3$ of the conventional composition was manufactured as described hereinafter. Namely, $La_2O_3$ in an amount of 97.7 g, $CrCO_3$ in an amount of 59.1 g and $Cr_2O_3$ in an amount of 76.0 g were mixed to synthesize $(La_{0.6}Sr_{0.4})CrO_3$ at the same process as described in the above embodiment 1 of the present invention. Also, the $(La_{0.6}Sr_{0.4})CrO_3$ was pulverized, filled in a forming mold and went through compressing and sintering processes to provide the sinter by the same process as that of the embodiment 1. The coefficient of linear contraction of the sinter provided was 0.2%. In addition, platinum paint was baked on the end faces of the sinter which was 12 mm in diameter and 15 mm in length to continuously measure the specific resistance, until 1,200° C. was reached, as described hereinabove. The results are shown by a curve P of the accompanying chart, the specific resistances being higher than those of the embodiment 1.

EMBODIMENT 2

One portion of a Cr ion was solid-solution-substituted with a Co ion in the same manner as that of the embodiment 1 to synthesize $(La_{0.3}Nd_{0.3}Sr_{0.4})(Cr_{0.99}Co_{0.01})O_3$. The coefficient of linear contraction of the sinter obtained was measured at 4.2%.

In addition, the specific resistance of the sinter was continuously measured, until 1,200° C. was reached, in the same manner as that of embodiment 1. The characteristic results are shown by the curve B of the accompanying chart, the specific resistances at various temperatures are smaller than the sintered products illustrated by the curve P.

EMBODIMENT 3

One portion of a Cr ion was solid-solution-substituted with a Co ion in the same manner as that of the embodiment 2 and the substitution ratio was slightly increased to synthesize $(La_{0.3}Nd_{0.3}Sr_{0.4})(Cr_{0.95}Co_{0.05})O_3$. The coefficient of linear contraction of the sinter obtained was measured at 6.5%.

In application, the specific resistance of the sinter was continuously measured, until 1,200° C. was reached, in the same manner as the embodiment 1. The application, results are shown by the curve C of the accompanying chart, in which the specific resistances at various temperatures are smaller than those of the embodiment 2 illustrated by curve B.

EMBODIMENT 4

The solid-solution-substitution rate of the Cr ion by the Co ion was further increased to 10% to synthesize the product $(La_{0.3}Nd_{0.3}Sr_{0.4})(Cr_{0.9}Co_{0.1})O_3$ in the same manner as described in the embodiment 1. The coefficient of linear contraction of the sinter obtained was measured at 12.0%.

In addition, the specific resistance of the sinter was continuously measured, until 1,200° C. was reached, in the same manner as the embodiment 1. The results are shown by the curve D of the accompanying chart, the specific resistances at various temperatures being smaller than those of the embodiment 3 illustrated by curve C.

EMBODIMENT 5

$La_2O_3$ in an amount of 56.2 g, $SrCO_3$ in an amount of 2.5 g, $Nd_2O_3$ in an amount of 8.2 g, $Cr_2O_3$ in an amount of 29.5 g and $Co_2O_3$ in an amount of 3.6 g were mixed and heated at 1,400° C. for one hour to synthesize the material $(La_{0.8}Nd_{0.16}Sr_{0.04})(Cr_{0.9}Co_{0.1})O_3$. The $(La_{0.8}Nd_{0.16}Sr_{0.04})(Cr_{0.9}Co_{0.1})O_3$ material was pulverized, filled in a forming mold and pressed under a pressure of 1 t per cm² and, thereafter, it was sintered in air at 1,600° C. for two hours. The coefficient of linear contraction of the sinter obtained was 12.9%. In addition, the lattice space of the sinter was measured through a powder X-ray diffraction method. The calculating density of the sinter which was obtained from the lattice space, became 6.76 (to be assumed as dc) and, if the sintering degree (%) was defined as $da/dc \times 100$ from the apparent density 6.53 (to be assumed as da) of the sinter, the real sintering degree of the sinter was 96.6%.

Also, the specific resistance of the sinter was continuously measured, until 1,200° C. was reached, in the same manner as that of the embodiment 1. The characteristic of results are shown by a curve E of the accompanying chart, the specific resistances at various temperatures being smaller than those illustrated by curve P.

EMBODIMENT 6

An Nd ion was solid-solution-substituted by a Y ion in the same manner as that of the embodiment 5 to synthesize the product $(La_{0.8}Y_{0.16}Sr_{0.04})(Cr_{0.9}Co_{0.1})O_3$. The coefficient of linear contraction of the sinter was measured at 14.5%. In addition, the real sintering degree of the sinter obtained in the same manner as that of the embodiment 5 was 97.8%.

Also, the specific resistance of the sinter was continuously measured, until 1,200° C. was reached, in the same manner as that of the embodiment 1. The characteristics results are shown by the curve F of the accompanying chart; the specific resistances at various temperatures being smaller than those of the curve P.

EMBODIMENT 7

$La_2O_3$ in an amount of 55.0 g, $SrCO_3$ in an amount of 12.5 g, $Cr_2O_3$ in an amount of 27.3 g, $Co_2O_3$ in an amount of 5.2 g were mixed and heated at 1,400° C. for one hour to synthesize the product $(La_{0.8}Sr_{0.2})(Cr_{0.85}Co_{0.15})O_3$. The coefficient of linear contraction of the sinter obtained through the sintering operation was performed in the same manner as that of the embodiment 5 and was found to be 14.0%.

In addition, the specific resistance was continuously measured, until 1,200° C. was reached, in the same manner as that of the embodiment 1. The characteristic results are shown by a curve G of the accompanying chart; the specific resistances at various temperatures being smaller than those of the embodiment 5 of curve E.

The coefficient of linear contraction of each sinter obtained in the above seven embodiments of the present invention is shown in Table 1 in comparison with that of the conventional example.

TABLE 1

| | Solid-solution composition | Coefficient (%) of linear Contraction of sinter |
|---|---|---|
| Conventional Example | $La_{0.6}Sr_{0.4}CrO_3$ | 0.2 |
| Present invention | | |
| Embodiment 1 | $(La_{0.3}Nd_{0.3}Sr_{0.4})CrO_3$ | 2.5 |
| Embodiment 2 | $(La_{0.3}Nd_{0.3}Sr_{0.4})(Cr_{0.99}Co_{0.01})O_3$ | 4.2 |
| Embodiment 3 | $(La_{0.3}Nd_{0.3}Sr_{0.4})(Cr_{0.95}Co_{0.05})O_3$ | 6.5 |
| Embodiment 4 | $(La_{0.3}Nd_{0.3}Sr_{0.4})(Cr_{0.9}Co_{0.1})O_3$ | 12.0 |
| Embodiment 5 | $(La_{0.8}Nd_{0.16}Sr_{0.04})(Cr_{0.9}Co_{0.1})O_3$ | 12.9 |
| Embodiment 6 | $(La_{0.8}Y_{0.16}Sr_{0.04})(Cr_{0.9}Co_{0.1})O_3$ | 14.5 |
| Embodiment 7 | $(La_{0.8}Sr_{0.2})(Cr_{0.85}Co_{0.15})O_3$ | 14.0 |

As apparent from the description of the embodiments, the molding and sintering operations of sinters in Table 1 were performed all under the same conditions. In accordance with the present invention, 1 to 60% of La ion is solid-solution-substituted in an oxidation atmosphere by an Nd or Y ion; 1 to 20% of Cr ion is solid-solution-substituted by a Co ion or 1 to 60% of a La ion is solid-solution-substituted by an Nd or y ion and simultaneously 1 to 20% of Cr ion is solid-solution-substituted by a Co ion, thereby to more significantly increase the linear contraction coefficients of the sinters to improve the sintering effects. The sintering degree is developed to improve the specific gravity of the sinter, resulting in a remarkably improved mechanical strength in the sintered product.

As apparent from the variations in the specific resistance at varied temperature conditions ranging from normal temperature to 1,200° C. of the conventional ones; the seven embodiments of the present invention as shown in the accompanying drawing, each specific resistance of the embodiments is extremely reduced with a rise in temperature, thereby causing the temperature coefficient of the resistance to become small. An extremely superior sinter can be provided as a heat resisting conductive material, eliminating the conventional difficulties involved in manufacturing sinters containing conductive La and Cr composite oxides as major components. Further, the sinters can be easily manufactured at a temperature as low as approximately 1,500° C., which is lower than before. In addition, the quality of the product to be manufactured by the sinter can be extremely improved.

Although the present invention has been described and illustrated in detail, it is to be clearly understood that the same is by way of limitation, the spirit and scope of the present invention being limited only by the terms of the appended claims.

What is claimed is:

1. A method of manufacturing highly conductive sinters consisting essentially of an oxide of La, Sr and Cr in which 1 to 60% by weight of the La ion in the oxide is solid solution substituted by a rare earth element selected from the group consisting of Nd and Y ions, said method comprising (1) mixing an oxide or a carbonate of the metal La, Sr and Cr and rare earth element selected from the groups consisting of Nd and Y in an amount sufficient to replace 1 to 60% by weight of the La ion; (2) heating the mixture at temperatures sufficient to form a composite oxide of the aforementioned metals; (3) crushing the composite oxide and (4) sintering the composite oxide under pressure in an oxidation atmosphere at temperatures sufficient to produce a sintered product.

2. A method according to claim 1 wherein the rare earth element is Nd.

3. A method according to claim 1 wherein the rare earth metal is Y.

4. A method according to claim 1 in which the composite oxide forming temperature is 1350° C. and the sintering temperature is 1500° C.

5. A method of manufacturing highly conductive sinters consisting essentially of an oxide of La, Sr and Cr in which 1 to 20% by weight of the Cr ion in the oxide is solid solution substituted by a Co ion, said method comprising (1) mixing an oxide or a carbonate of the metals La, Sr, Cr, and Co in an amount sufficient to replace 1 to 20% of the Cr ion in a solid solution; (2) heating the mixture at temperatures sufficient to form a composite oxide of the aforementioned metals; (3) crushing the composite oxide and (4) sintering the composite oxide under pressure and in an oxidation atmosphere at temperatures sufficient to produce a sintered product.

6. A method according to claim 5 in which the composite oxide forming temperature is 1350° C. and the sintering temperature is 1500° C.

7. A method of manufacturing highly conductive sinters consisting essentially of an oxide of La, Sr and Cr in which 1 to 60% by weight of the La ion in a solid solution is replaced by an Nd or Y ion and 1 to 20% by weight of the Cr ion is replaced by a Co ion in a solid solution, said method comprising (1) mixing an oxide or a carbonate of the metals La, Sr, Cr, Co and Nd or Y in such amounts so that 1-20% of the Cr ion is replaced by the Co ion and 1-60% of the La ion is replaced by Nd or Y in solid solution; (2) heating the mixture at temperatures sufficient to form a composite oxide of the aforementioned metals; (3) crushing the composite oxide and (4) sintering the composite oxide under pressure in an oxidation atmosphere at temperatures sufficient to produce a sintered product.

8. A method according to claim 6 in which the composite oxide forming temperature is 1350° C. and the sintering temperature is 1500° C.

9. A method according to claim 1 in which the sintered product has the composition $(La_{0.3}Nd_{0.3}Sr_{0.4})CrO_3$.

10. A method according to claim 7 in which the sintered product has the composition $(La_{0.3}Nd_{0.3}Sr_{0.4})(Cr_{0.99}Co_{0.01})O_3$.

11. A method according to claim 7 in which the sintered product has the composition $(La_{0.3}Nd_{0.3}Sr_{0.4})(Cr_{0.95}Co_{0.05})O_3$.

12. A method according to claim 7 in which the sintered product has the composition $(La_{0.3}Nd_{0.3}Sr_{0.4})(Cr_{0.9}Co_{0.1})O_3$.